United States Patent
Cetoli et al.

(10) Patent No.: US 12,511,301 B1
(45) Date of Patent: Dec. 30, 2025

(54) GENERATING STRUCTURED DOCUMENTS WITH TRACEABLE SOURCE LINEAGE

(71) Applicant: Citibank, N.A., New York, NY (US)

(72) Inventors: Alberto Cetoli, London (GB); Isabelle Choudhry, London (GB); Jakub Cysar, Prague (CZ); Jason Ryan Engelbrecht, London (GB); Mark Fullbrook, London (GB); Alexis Rialt, London (GB)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/286,169

(22) Filed: Jul. 30, 2025

(51) Int. Cl.
　　*G06F 16/2457* 　　(2019.01)
　　*G06F 16/22* 　　(2019.01)
　　*G06F 16/248* 　　(2019.01)

(52) U.S. Cl.
　　CPC .... *G06F 16/24578* (2019.01); *G06F 16/2237* (2019.01); *G06F 16/248* (2019.01)

(58) Field of Classification Search
　　None
　　See application file for complete search history.

(56) References Cited

U.S. PATENT DOCUMENTS

| | | | |
|---|---|---|---|
| 12,405,985 B1* | 9/2025 | Kanagovi | G06F 16/335 |
| 12,443,894 B1* | 10/2025 | Bhat | G06N 20/20 |
| 2008/0306943 A1* | 12/2008 | Patterson | G06F 16/24578 |
| 2020/0233914 A1* | 7/2020 | Mertens | G06F 16/24578 |
| 2024/0232539 A1* | 7/2024 | Venkateshwaran | G06N 3/044 |
| 2025/0165463 A1* | 5/2025 | Brenner | G06F 16/242 |
| 2025/0232496 A1* | 7/2025 | Ethirajan | G06N 3/045 |
| 2025/0315486 A1* | 10/2025 | Dar | G06F 16/93 |
| 2025/0322087 A1* | 10/2025 | Salarian | G06F 21/6209 |

\* cited by examiner

*Primary Examiner* — Khanh B Pham
*Assistant Examiner* — Navneet Gmahl
(74) *Attorney, Agent, or Firm* — Perkins Coie LLP; Sumedha Ahuja; Willa Wu

(57) ABSTRACT

Systems and methods disclosed herein are enabled to dynamically generate structured documents using one or more artificial intelligence models. A computing device receives an output generation request and uses a first AI model to retrieve data chunks from source documents and applicable templates. A second AI model ranks the retrieved chunks based on one or more metrics, such as vector similarity, keyword density, and temporal relevance. A third AI model subsequently generates a response using the ranked chunks, templates, and predefined operational boundaries for each chunk. The generated response is tagged with source identifiers to enable the traceability of the response back to corresponding chunks. The system transmits, via the computing device, the response, the retrieved chunks, and/or the source identifiers.

20 Claims, 8 Drawing Sheets

Project Progress
- Project Details
- Document Upload
- Drafting
  ○ Guidance Verification
  ○ Evaluation

Project Sections

| | |
|---|---|
| Obligor / Counterparty Overview | ⊘ |
| Source Of Repayment | ○ |
| Key Risks & Mitigants | ○ |
| Operating Performance Highlights | ○ |
| Operating Performance Highlights – Profitability | ○ |
| Leverage | ○ |
| Cash Flow Highlights | ○ |
| Liquidity | ○ |
| Balance Sheet Highlights | ○ |
| Refinancing Risks And Debt Maturity Schedule | ○ |
| Outlook And Projections | ○ |
| Management Assessment | ○ |
| Industry Update | ○ |

1000837136_COMPANY X_CEP
COMPANY X 1000837136

AI Generated Draft 202  ⟲  ⟨ Previous  1  Next ⟩
Created by UserX at 16:00 May 14 2025

Company X is a multinational telecommunications company headquartered in Stockholm, Sweden. The company has public credit ratings of Baa1 from XXXX's and BBB+ from YYYY. Company X operates across six geographical markets, offering a broad range of products and services spanning telecommunication, IT, and media. The company's key business segments include mobile and fixed voice and data, TV and streaming, ICT services, and devices. Revenue numbers for each segment are as follows: [SEK 12,345 million for mobile and fixed voice and data, SEK 12,345 million for TV and streaming, SEK 1,234 million for ICT services, and SEK 1,234 million for devices]. The company's financial information is based on the accounting period ending December 31, 2049.

[This paragraph was sourced from 208 chunk 1, chunk 2 and chunk 3] ded company listed on the Stockholm Stock y's CEO is Person X. The firm's internal operating subsidiaries, with a focus on entities key to revenue generation or assets concentration. The company's ownership structure is dispersed among several major shareholders. 🔗

The three main risks for Company X that most affect its ability to fulfill obligations and its credit risk are: credit risk, liquidity risk, and operational risk. Credit risk arises from the company's exposure to counterparties, while liquidity risk is related to the company's ability to meet its financial obligations. Operational risk is associated with the company's internal processes and systems. 🔗

---

Credit Approval Memo (Model X) v1 ⋯
Created by UserX on May 14 2051

User Draft 204
↶ ↷ | B *I* U̲ | Paragraph ⌄ | ≡ ≡ | — ▭

Company X is a multinational telecommunications company headquartered in Stockholm, Sweden. The company has public credit ratings of Baa1 from XXXX and BBB+ from YYYY. Company X operates across six geographical markets, offering a broad range of products and services spanning telecommunication, IT, and media. The company's key business segments include mobile and fixed voice and data, TV and streaming, ICT services, and devices. Revenue numbers for each segment are as follows: [ZZZ 12,345 million for mobile and fixed voice and data, ZZZ 12,345 million for TV and streaming, ZZZ 1,234 for ICT services, and ZZZ 1,234 million for devices]. The company's financial information is based on the accounting period ending December 31, 2049.

[Save Draft] [Mark as Incomplete] [Perform Guidance Verification]

Guidance Verification 206  [⟲ Regenerate]

Obligor / counterparty overview
Criteria for this section are:

✓ Inclusion of overall discription of company business
The section provides a brief overview of Company X, including its headquarters, public credit ratings, and the range of products and services it offers.

✓ Inclusion of business segments
The section breaks down the company's key business segments, including mobile and fixed voice and data, TV and streaming, ICT services, and devices, along with their respective revenue numbers.

*FIG. 2*

Retrieved Chunks 302

| Chunk 1 | Chunk 2 | Chunk 3 | Chunk 4 | Chunk 5 | Chunk 6 | Chunk 7 | Chunk 8 |

📄 Company_X_Interim_Report_1A2049.pdf  304    Page 35    ↗ Open document  306

Company X Interim Report January – March 2049
Q1

35
Risks
Company X operates across six geographical markets, offering a broad range of products and services spanning telecommunication, IT, and media. These markets are competitive and highly regulated. Company X defines risk as anything that could have a material adverse effect on the achievement of the company's goals. Risk can be threats, uncertainties or lost opportunities relating to the company's current or future operations or activities.
Company X has an established Enterprise Risk Management Framework that it uses to regularly identify, analyze, assess and report strategic, operational, financial and compliance risks, and to manage such risks as appropriate. The Company X Risk Universe consists of a Principal Risk taxonomy, based on the Principal Risk areas and sub-risk areas identified and prioritized with Company X's Group Executive Management as the most material risks related to the company's objectives and operations. The Principal Risks are assessed and aggregated across the whole company using the Enterprise Risk Management Framework. Risk management is an integrated part of Company X's business planning process and monitoring of business performance.
For further information regarding details on the risk exposure and risk management, see the Annual report 2049, Directors Report, section risks.

*FIG. 3*

| Tenant | Model(s) | Prompts | RAG | Status | Created At | Last Modified At | Last Modified By |
|---|---|---|---|---|---|---|---|
| Credit Approval Memos | - | 10 | Yes | Live | 2050-04-01 09:20 | 2050-05-16 15:39 | UserX |

Template Structure

+ Add Item
- ≡ Guidance Verification Prompt
- ≡ Data Accuracy Prompt
- ≡ LLM Output Schema
- ≡ RAG Chunk Template ▼ Elements
- ▦ Obligor / Counterparty Overview
- ▦ Source Of Payment
- ▦ Key Risks & Mitigants
- ▦ Operating Performance Highlights
- ▦ Operating Performance Highlights - Profitability

Configure Element

Please add the element name, description and provide a core prompt.

Name [Obligor / Counterparty Overview] ~402    Description [Obligor / Counterparty Overview] ~404    Display Order [1] ~406

Core prompt ~408

1. The Section you are writing is Obligor Overview.
2. Business Description:
3. Provide a bullet-point business analysis of the firm
4. - Description of the firm's business, including its headquarters (city and state)
5. - Public credit rating (XXXX's and YYYY)
6. - Industry position and brand recognition Guidance Criteria ~410

Criteria for this section are:
1. Inclusion of overall description of company business.
2. Inclusion of business segments.
3. Inclusion of ownership structure.
4. Mentioning of Risk Rating and Classification.
5. Inclusion of at least three risks with summary at the end of this section.
6. Language should be grammatically correct and understandable.

Similarity To Top K

*FIG. 4*

GENERATING STRUCTURED DOCUMENTS WITH TRACEABLE SOURCE LINEAGE

BACKGROUND

Artificial intelligence (AI) models often operate based on extensive and enormous training data. The models include a multiplicity of inputs and how each should be handled. When the model receives a new input, the model produces an output based on patterns determined from the data the model was trained on. A large language model (LLM) is a language model notable for its ability to achieve general-purpose language generation and other natural language processing tasks such as classification. LLMs can be used for text generation, a form of generative AI (e.g., GenAI, Gen AI, or GAI), by taking an input text and repeatedly predicting the next token or word. LLMs acquire these abilities by learning statistical relationships from text documents during a computationally intensive self-supervised and semi-supervised training process. Generative AI models, such as LLMs, are increasing in use and applicability over time.

Retrieval-augmented generation (RAG) is a technique that enables generative AI models to retrieve and incorporate new information. RAG modifies interactions with a generative AI model so that the model responds to user queries with reference to a specified set of documents, using this information to supplement information from its pre-existing training data. This enables the generative AI model to use domain-specific and/or updated information. Use cases include providing chatbot access to internal company data or generating responses based on authoritative sources. Unlike traditional LLMs that rely on static training data, RAG pulls relevant text from databases, uploaded documents, or web sources. By dynamically retrieving information, RAG enables AI to provide more accurate responses without frequent retraining. However, conventional RAG systems struggle with maintaining consistency across long-form documents, properly attributing retrieved information, and dynamically adapting to varying use cases of the query.

BRIEF DESCRIPTION OF THE DRAWINGS

FIG. 2 is a screenshot illustrating an example environment of a set of documents generated by a data generation platform according to some implementations of the present technology.

FIG. 3 is a screenshot illustrating an example environment of a corresponding set of source artifacts used by a data generation platform to generate the set of documents in FIG. 2 according to some implementations of the present technology.

FIG. 4 is a screenshot illustrating an example environment of a template library used by a data generation platform to generate the structured responses according to some implementations of the present technology.

Figure 1:
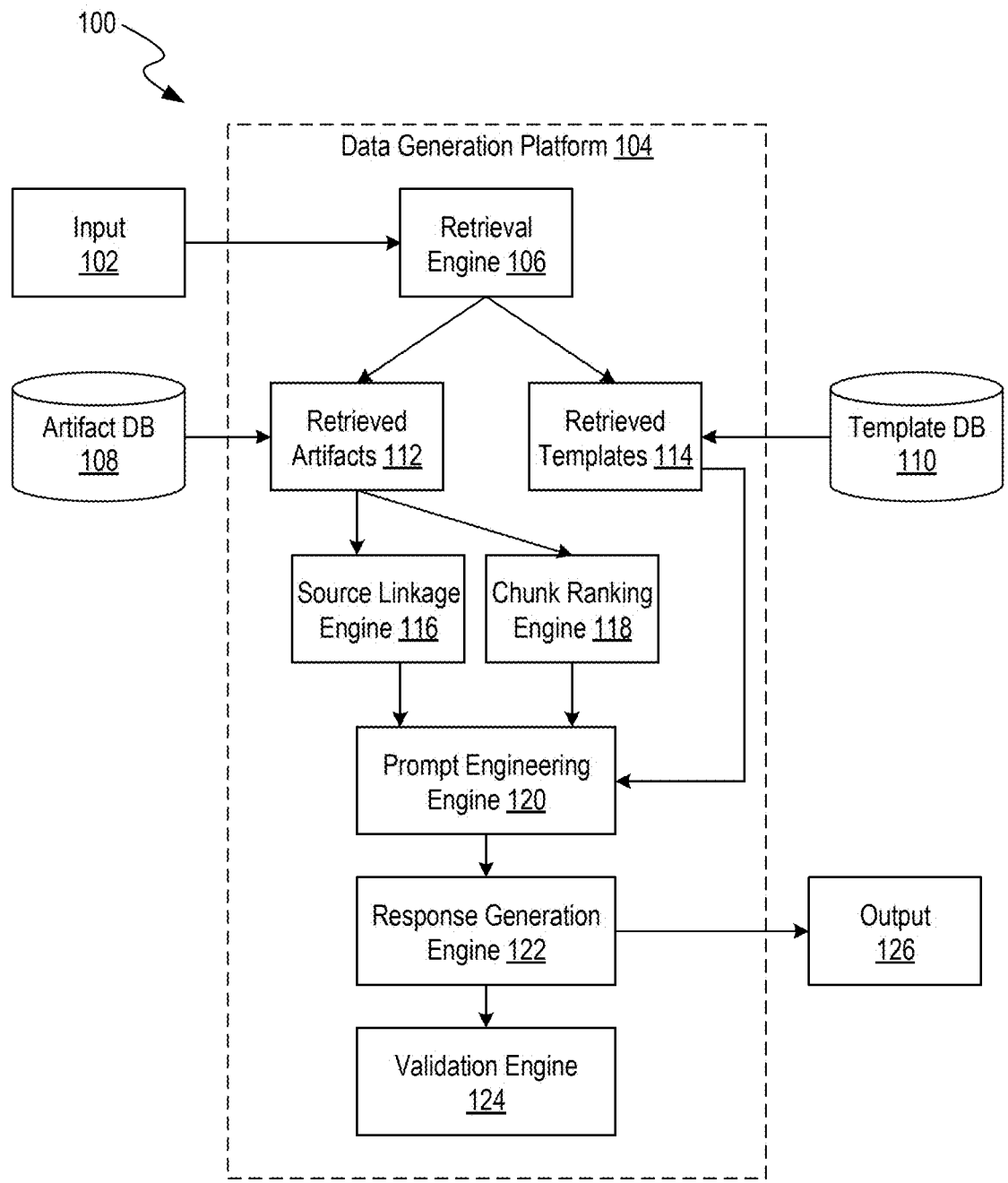
FIG. 1 illustrates an example environment of a data generation platform for dynamically generating structured responses (such as forms) traceable to source artifacts (such as source documents) using artificial intelligence (AI) models in accordance with some implementations of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Structured data refers to information that is organized according to a consistent schema or model. This includes database tables with defined columns and data types, relational database records with foreign key relationships, and so forth. Structured documents represent a subset of structured data that follows a predefined organization structure. Structured documents typically include information arranged in standardized templates, forms, or schemas where each data element is assigned to a designated location and format. Structured documents can include database records (e.g., transaction entries, transaction logs), markup language files (i.e., extensible Markup Language (XML) documents, JavaScript Object Notation (JSON) objects, and so forth), spreadsheets with defined columns and data types, standardized forms with specific input fields (e.g., tax returns, insurance claims), and so forth. Characteristics of structured documents include defined data schemas, consistent field naming conventions, standardized data types (i.e., text strings, numerical values, date formats), hierarchical organization, and so forth.

Structured documents are often used to capture and organize information (e.g., financial information such as that used throughout stages of the lending process). For example, credit applications include standardized fields for borrower demographics, income verification, and employment history, while loan agreements include structured sections for interest rates, payment schedules, and collateral descriptions. Payment histories can be maintained in structured formats that trace transaction dates, amounts, and account statuses. Risk assessment documents (e.g., credit scoring models, probability of default calculations) can use structured data formats to consistently evaluate different loan products. Regulatory compliance reports (i.e., Basel III capital adequacy reports, Fair Credit Reporting Act disclosures, and so forth) typically require structured documentation to meet standardized reporting requirements.

The generation of structured documents in conventional data generation systems can include the manual compilation from multiple source artifacts (e.g., documents, images, video, audio, and so forth), which creates significant operational challenges and technical inefficiencies. Unstructured data (i.e., data not following a consistent schema) is gathered from various distributed systems (e.g., banking platforms, customer relationship management systems, external credit bureaus), legacy databases with different data formats, and/or paper-based sources (i.e., physical application forms, signed contracts, notarized documents) and then manually transformed into the structured document format. In some implementations, retrieval-augmented generation (RAG) is used to generate vector embeddings that capture the semantic content of source artifacts (or chunks thereof). When generating a structured document, conventional data generation systems retrieve relevant chunks based on similarity searches between the generation query and the embedded source materials and then provide these chunks as context to the language model to generate the structured document.

However, when aggregating data from multiple sources (e.g., customer databases, external application programming interfaces (APIs), legacy systems), conventional data generation systems fail to trace which specific source artifacts contribute to particular sections or fields within the generated structured documents. Even when structured documents are generated through automated processes, conventional data generation systems combine information from different sources (i.e., credit reports, bank statements, employment records, tax documents) without preserving metadata that indicates which specific artifact provided each piece of information. The absence of traceability creates significant challenges for data validation, audit compliance, and error correction, as users cannot identify the source of inaccurate or outdated information within the final structured document. Additionally, when discrepancies arise between different versions of structured documents or when regulatory audits require source verification, the lack of artifact-level traceability makes it difficult to reconstruct the data compilation process or verify the authenticity and accuracy of specific information elements.

Further, conventional data generation systems face significant challenges in managing the diverse usage requirements that can apply to different pieces of information within source datasets. Conventional data generation systems typically treat all retrieved information uniformly and apply the same transformation rules regardless of the specific constraints or permissions associated with individual data elements. However, in practice, different pieces of information may be subject to different operational requirements based on factors such as copyright restrictions, regulatory compliance mandates, data licensing agreements, organizational policies, and so forth. For instance, certain source artifacts may require verbatim reproduction to maintain legal accuracy, while other source artifacts may allow for paraphrasing or summarization. Further, some source artifacts may be restricted to specific usage contexts. Conventional data generation systems are unable to recognize and enforce these varying requirements at the individual data element/chunk/document level. The absence of usage control creates compliance risks and reduces output quality.

Attempting to create a system to generate structured documents with traceable source lineage in view of the available conventional approaches created significant technological uncertainty. Creating such a system requires addressing several unknowns in conventional approaches to document generation, such as maintaining source attribution and generating structured data dynamically based on varying content requirements that may differ between source artifacts. The static nature of RAG in conventional document generation systems that rely on uniform data processing and predefined templates makes it challenging to adapt the generation process to the real-time or near real-time changes of source artifacts. Static retrieval may fail to anticipate the wide range of usage restrictions and operational boundaries that can arise in near-real-time or real-time document generation. As a result, conventional methods often fail to adapt to new content requirements of particular source artifacts, increasing the risk of compliance violations.

To overcome the technological uncertainties, the inventors systematically evaluated multiple design alternatives. For example, the inventors evaluated systems that relied on periodic manual reviews of generated documents to ensure compliance with source attribution requirements. The systems included reviewers (e.g., individuals, automated systems) periodically validating the accuracy of generated content and verifying that all source materials were being properly cited (e.g., that the citations were compliant with the operational boundaries). Additionally, the inventors evaluated systems (e.g., machine learning models) that automatically generated structured documents using predefined templates and source documents. Each template section can be populated by retrieving and inserting content from available source artifacts.

However, the manual review approach and the validation approach proved to be inflexible and difficult to maintain. The manual review approach, while thorough, was slow and resource-intensive, often resulting in delayed generation of the structured document and detection of attribution issues. The reliance on reviewers further continued to introduce the potential for human error and inconsistencies in the review process. Further, the automated generation approach failed to account for the varying operational boundaries and usage restrictions that apply to different source artifacts on a per-data-element, per-data-chunk, and/or per-artifact basis. For example, using the automated generation approach, content that required verbatim reproduction may instead be summarized.

As such, the inventors have developed systems (hereinafter "data generation platform") and related methods to automatically/dynamically generate structured documents with traceable source lineage using artificial intelligence (AI) models. The data generation platform obtains an output generation request (e.g., from a graphical user interface (GUI)) to generate an output comprising a plurality of document sections using source artifacts and templates. The data generation platform retrieves a chunk set from source artifacts using a first AI model set (e.g., retrieval engines) and dynamically generates a ranking set of the chunk set using a second AI model set (same as or different from the first AI model set) based on one or more metrics, such as vector similarity, keyword density, and temporal relevance. The data generation platform generates a response using a third AI model set (same as or different from the first and/or second AI model sets) using the ranked chunks, templates, and predefined operational boundaries for each chunk to create structured documents responsive to the output generation request. The generated response can be tagged (e.g., annotated) with source identifiers to enable the traceability of the response back to corresponding chunks. The system transmits, via the computing device, the response, the retrieved chunks, and/or the source identifiers. In some implementations, the data generation platform displays (e.g., on the GUI) representations of the response, retrieved chunk set, and/or source identifiers linking generated content to source materials.

Unlike conventional document generation systems that lose the connection between generated content and source artifacts, the data generation platform maintains bidirectional mappings between portions of the output and its corresponding source chunks through an identifier tag (e.g., a unique identifier). Each identifier tag can indicate the specific operational boundaries applied to the source chunk, such as whether the content was used verbatim, paraphrased, or summarized, the confidence scores and ranking metrics that influenced its selection and usage, and so forth. Further, the identifier tags can be implemented as structured metadata objects that indicate hierarchical information, including the original source document identifier, specific chunk location markers (such as page numbers, paragraph indices, or byte offsets), the AI model version and parameters used for processing, timestamps indicating when each transformation occurred, and so forth. The data generation platform can maintain a relational database that maps these identifiers to their corresponding source materials to enable subsequent lookup and verification of any generated content segment.

While the current description provides examples of the rule application engine related to LLMs, one of skill in the art would understand that the disclosed techniques can apply to other forms of machine learning or algorithms, including unsupervised, semi-supervised, supervised, and reinforcement learning techniques. For example, the disclosed data generation platform can generate structured artifacts with traceable source lineage using support vector machine (SVM), k-nearest neighbor (k-NN), decision-making, linear regression, random forest, naïve Bayes, or logistic regression algorithms, gradient boosting, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Example Implementations of the Data Generation Platform

FIG. 1 illustrates an example environment 100 of a data generation platform 104 for dynamically generating structured responses (such as forms) traceable to source artifacts (such as source documents) using AI models in accordance with some implementations of the present technology. The example environment 100 can include an input 102, the data generation platform 104, an artifact database 108, and a template database 110. The data generation platform 104 can include a retrieval engine 106, retrieved artifacts 112, retrieved templates 114, a source linkage engine 116, a chunk ranking engine 118, a prompt engineering engine 120, a response generation engine 122, a validation engine 124, and an output 126. The example environment 100 can include one or more models that are the same as or similar to AI system 600, illustrated and described in more detail with reference to FIG. 6. The example environment 100 can be implemented using components of example computer system 700 illustrated and described in more detail with reference to FIG. 7. Implementations of the example environment 100 can include different and/or additional components or can be connected in different ways.

The data generation platform 104 receives input through an input interface 102 and produces output via an output interface 126. The input interface 102 accepts various forms of inputs (input 102, e.g., requests, instructions, commands, queries), such as natural language queries, unstructured commands, structured commands, or API calls specifying document generation parameters. For example, the input is a text prompt requesting a specific type of document to be generated, a set of parameters defining the desired output format and content, an indication of a data structure including one or more fields and/or requirements, and so forth. The input 102 can include metadata such as user credentials, project identifiers, or other contextual information that can be used as a conditioning signal to guide the generation of the structured response(s).

The data generation platform 104 communicates (e.g., via an API) with an artifact database 108 and a template database 110 to retrieve and process contextual information used to generate the structured response(s). The artifact database 108 can refer to a repository for source documents, which may include textual data (e.g., reports, articles, transcripts), structured numerical datasets (e.g., financial statements, statistical tables), multimedia content (e.g., images, audio files, videos), and so forth. The template database 110 can store predefined document structures, formatting rules, content guidelines, and so forth for various document types. For example, a template for a credit risk assessment can specify sections for financial analysis, market position, and risk factors, along with formatting requirements such as font styles, header structures, and data presentation formats.

The retrieval engine 106 can use one or more information retrieval methods to extract relevant data from the artifact database 108 and/or template database 110. For example, the retrieval engine 106 uses TF-IDF (Term Frequency-Inverse Document Frequency), which calculates a degree of importance of words in a document relative to a collection. The retrieval engine 106 can compute TF-IDF scores for each term in the input query and each document in the database. For example, if the input is "recent financial performance of Company X," terms such as "financial," "performance," and "Company X" can be weighted heavily, while common words like "of" can be assigned lower weights. The retrieval engine 106 can rank documents based on their cumulative TF-IDF scores for the query terms. Latent Semantic Analysis (LSA) can be used to construct a term-document matrix and applies singular value decomposition to identify underlying concepts. Thus, the retrieval engine 106 can capture semantic relationships beyond exact keyword matches. For instance, a document discussing "revenue growth" can be retrieved for a query about "financial performance," even if those exact words are not present. Transformer-based semantic searches, which use neural networks pre-trained on text corpora, can be used by encoding both the query and documents into high-dimensional vectors and then computing similarity scores between these vectors to identify the documents closest in distance. The retrieved artifacts 112, which refer to source documents, and retrieved templates 114, which refer to document structures and formatting guidelines, can be structured information packets that include metadata about their relevance, source, and context within the original documents. The granularity of these retrieved elements can be adjusted based on the specific requirements of the document being generated (e.g., as specified in the input 102).

After retrieval, the source linkage engine 116 can generate or otherwise provide traceable connections between generated content and source materials. The source linkage engine 116 generates, for example, metadata that links specific portions of the generated document to corresponding chunks in the source artifacts. The source linkage engine 116 enables provenance tracing and verification of information sources within the output 126 (e.g., structured response(s)). The metadata can include unique identifiers for the source document, specific location markers (e.g., page numbers, paragraph indices), timestamps, and relevance scores. For example, if a generated financial report includes a statement about a company's revenue growth, the source linkage engine can generate metadata like {source_id: "Q3_2023_Report", page: 15, paragraph: 2, timestamp: "2023-10-15T14:30:00Z", relevance_score: 0.92}. The metadata can then be embedded within the generated output 126 as hidden tags, annotations, and/or hyperlinks. For example, the data generation platform includes hover-over source attribution in digital documents or clickable footnotes that lead directly to the original retrieved artifacts 112. The source linkage engine 116 can maintain a separate database of the linkages.

Operating in parallel or sequentially, the chunk ranking engine 118 prioritizes the retrieved information. The chunk ranking engine 118, for example, generates chunks from the retrieved artifacts 112 and generates values for metrics such as relevance scores, temporal factors, or source authority to determine the degree of prioritization (i.e., a weight) and order of information chunks. The chunks can be segments of the retrieved artifacts 112, which can be segmented by paragraphs, sentences, words, semantic topics, size, and so forth. For each chunk, the chunk ranking engine 118 calculates multiple metric values to determine its priority. Relevance scores can be computed using cosine similarity between the chunk's vector representation and the query vector in a high-dimensional semantic space. Temporal factors can be considered by applying a decay function to the chunk's timestamp and assigning higher weight to more recent information (or completely filtering out documents failing to satisfy a particular timestamp). For example, in a financial context, data from the most recent quarter receives a temporal score of 1.0, while data from two years ago scores 0.5. Source authority can be evaluated based on predefined criteria, such as the reliability of the publication, the author's credentials, or the document's official status. The individual metrics can be combined using a weighted sum to produce a final priority score for each chunk. For instance, a chunk can have a composite score calculated as: score=0.5 relevance+0.3 recency+0.2 authority. The chunk ranking engine 118 is enabled to sort these chunks based on their scores, creating a ranked list that determines the order and prominence of information in the generated document.

The prompt engineering engine 120 formulates structured prompts based on the input 102, retrieved data (e.g., the retrieved artifacts 112 and/or the retrieved templates 114), and ranked information chunks from the chunk ranking engine 118. The prompt engineering engine 120 is enabled to translate user requirements from the input 102 and available information into a format compatible with the output 126 (e.g., a document, a form). For example, the prompt engineering engine 120 maps these requirements to particular sections of the retrieved templates 114. For each section, the prompt engineering engine 120 constructs a specific sub-prompt using chunks from the ranked list provided by the chunk ranking engine 118. For example, if generating a market analysis report, a sub-prompt for the competitive landscape section can be structured as: "Analyze the competitive position of [Company X] in the [Industry Y] market. Use the following data points in your analysis: [Insert top 3 ranked chunks about market share]. Compare this to the historical trend: [Insert highest-ranked historical data chunk]. Ensure the analysis covers a 5-year period and includes a forward-looking statement based on [Insert highest-ranked future projection chunk]." The prompt engineering engine 120 can include specific instructions about tone, level of detail, or required citations based on the template guidelines in the retrieved templates 114.

The validation engine 124 can perform automated checks on the generated output 126 from the response generation engine 122 to ensure compliance with specified criteria, such as formatting rules, content requirements, regulatory guidelines, or other operative boundaries. The validation engine 124 can use rule-based systems and/or machine learning models to identify and flag gaps (i.e., discrepancies) between the output 126 and criteria before delivery of the output 126 to downstream applications (e.g., an AI model, a user interface, and so forth). The rules can include verifying the presence of required sections, checking for specific keywords or phrases mandated by regulatory guidelines, or ensuring that numerical data falls within expected ranges. For example, in a financial report, the engine verifies that all required disclosures are present and that financial figures sum correctly across different sections. Machine learning models, such as those based on natural language processing, can evaluate factors such as tone, clarity, and logical coherence. For instance, a model can be trained to identify potential conflicts or inconsistencies in the presented information. The validation process can include checks against external databases or APIs to verify factual accuracy. The validation engine 124 can generate a report indicative of the gaps and use the gaps to retrain one or more models within other components of the environment 100 (e.g., the prompt engineering engine 120) for subsequent outputs.

FIG. 2 is a screenshot illustrating an example environment 200 of a set of documents generated by a data generation platform according to some implementations of the present technology. The example environment 200 can include an AI-generated draft 202, a user-edited draft 204, a guidance verification report 206, and a source identifier 208. The example environment 200 can be implemented using components of example computer system 700 illustrated and described in more detail with reference to FIG. 7. Implementations of the example environment 200 can include different and/or additional components or can be connected in different ways.

The AI-generated response 202 (e.g., draft) refers to a data structure, such as a text container element, that displays automatically generated content produced by the data generation platform's response generation engine 122 in FIG. 1 (i.e., the output 126 in FIG. 1). For example, the AI-generated response 202 can be implemented as a non-editable text field to prevent direct user modification. The content within the AI-generated response 202 can be dynamically populated with structured information retrieved from a database or API endpoint. For example, in FIG. 2, the AI-generated response 202 is populated with information associated with COMPANY X, formatted as plain text. The text includes information such as the company's description, headquarters location, credit ratings, and financial figures. For instance, the AI-generated response 202 in FIG. 2 states "Company X is a multinational telecommunications company headquartered in Stockholm, Sweden" and provides revenue breakdowns such as "SEK 12,345 million for mobile and fixed voice and data." Each portion of the AI-generated response 202 can be tagged with a source identifier 208 to indicate one or more chunks of the source artifacts used to generate the specific portion of the AI-generated response 202.

The user-edited draft 204 is an editable rich text field that enables human (or other application) modification of the AI-generated draft 202. For example, users such as humans, software applications, or AI models are enabled to refine, correct, or augment the AI-generated draft 202 based on their domain knowledge or access to additional information. The field of the user-edited draft 204 can include text formatting options such as bold, italic, underline, paragraph alignment controls, and so forth.

The guidance verification report 206 refers to a dynamic checklist indicative of a list of criteria. For example, in FIG. 2, the guidance verification report 206 represents each criterion with a checkbox input element paired with a text label. Each criterion can be stored with associated properties such as an identifier (ID), description, and verification status. The environment 200 can include a button configured to dynamically update the properties of the criteria when triggered. When activated, the button can trigger a server-side workflow that re-evaluates the document content against the stored criteria and updates the checkbox states. In some implementations, as users type or paste content in the user-edited draft 204, event listeners attached to the field can trigger functions that update the guidance verification report 206 in near real time or real time.

FIG. 3 is a screenshot illustrating an example environment 300 of a corresponding set of source artifacts used by a data generation platform to generate the set of documents in FIG. 2 according to some implementations of the present technology. The example environment 300 can include retrieved chunks 302, chunk content 304, and link 306. The example environment 300 can be implemented using components of example computer system 700 illustrated and described in more detail with reference to FIG. 7. Implementations of the example environment 300 can include different and/or additional components or can be connected in different ways.

The retrieved chunks 302 refer to a list of discrete segments of information extracted from the source artifacts. Each chunk can refer to a self-contained unit of data within the source artifacts. The retrieved chunks 302 can be stored in a database as individual records, each with a unique identifier, metadata tags, and content. The data generation platform 104 can query the database using methods discussed with reference to FIGS. 1 and 5 to identify the retrieved chunks 302. The retrieved chunks can be ranked, prioritized, and/or numbered sequentially (Chunk 1, Chunk 2, etc.) based on a degree of relevance of the chunk to the generated document. The degree of relevance can be based on, for example, the chunk's semantic similarity to the document template, the recency of the information, the degree of authority of the source, and so forth.

The chunk content 304 displays the actual content of a selected chunk, such as text, audio, image, video, and so forth. When a user selects a specific chunk from the list, the corresponding chunk content 304 can be loaded and displayed in the chunk content area. This interaction can trigger additional background processes, such as updating relevance scores based on user selection patterns, pre-fetching related chunks, and so forth. The link 306, illustrated as an "Open document" button or control in FIG. 3, refers to an interactive element that, when activated, enables users to access and view the full source document from which the currently displayed chunk was extracted. When triggered, the link 306 can open the complete source document in a separate viewer or window and can further directly display the full document at the location of the respective chunk.

FIG. 4 is a screenshot illustrating an example environment 400 of a template library used by a data generation platform to generate the structured responses according to some implementations of the present technology. The example environment 400 can include a template name 402, a template description 404, a template display order 406, a prompt 408, and guidance criteria 410. The example environment 400 can be implemented using components of example computer system 700 illustrated and described in more detail with reference to FIG. 7. Implementations of the example environment 400 can include different and/or additional components or can be connected in different ways.

The template name 402 is a text input field enabling users to specify an identifier (e.g., unique identifier) for the template element being configured. In this example, the field describes "Obligor/Counterparty Overview" for a template directed to an overview of an entity being assessed in the credit approval memo. The template name can be used as a reference for organizing and retrieving specific sections of the document template. The template name 402 can be stored in a database (e.g., a table) that maps template elements to their respective configurations and content guidelines. The template description 404 refers to a text input field where users are enabled to input (or the data generation platform is enabled to use an AI model to generate) an explanation describing the template. The template display order 406 is a numeric input field that determines the sequence in which template elements appear in the generated document. In this case, the value is set to "1," which indicates that that the Obligor/Counterparty Overview section appears at the beginning of the credit approval memo. The display order value can be used by the document generation platform to sort and arrange content blocks when assembling the response (e.g., the output 126 in FIG. 1).

The prompt 408, labeled as "Core prompt" in the interface of FIG. 4, can refer to a multi-line text area including commands and/or instructions for generating content for the specific template element. The instructions in FIG. 4 include directives such as "Provide a bullet-point business analysis of the firm." The prompt 408 is transmitted into one or more input nodes of an input layer of the AI model used to generate the response. The guidance criteria 410 refers to a text area that lists guidelines for the content generated in this section, such as those used in the guidance verification report 206 in FIG. 2. The guidance criteria 410 can be used both to guide the AI in producing compliant content and to conduct an automated validation to check if the generated content (and potentially human-edited content such as the user-edited draft 204 in FIG. 2) adheres to the guidance criteria 410. The interface of the environment 400 can include additional metadata about the template, such as the number of prompts, RAG status, modification history, and so forth. For instance, the "RAG: Yes" indicator in FIG. 4 can indicate that the template is configured to use external knowledge retrieval to augment the AI's base knowledge when generating content.

Example Methods of Using the Data Generation Platform

Figure 5:
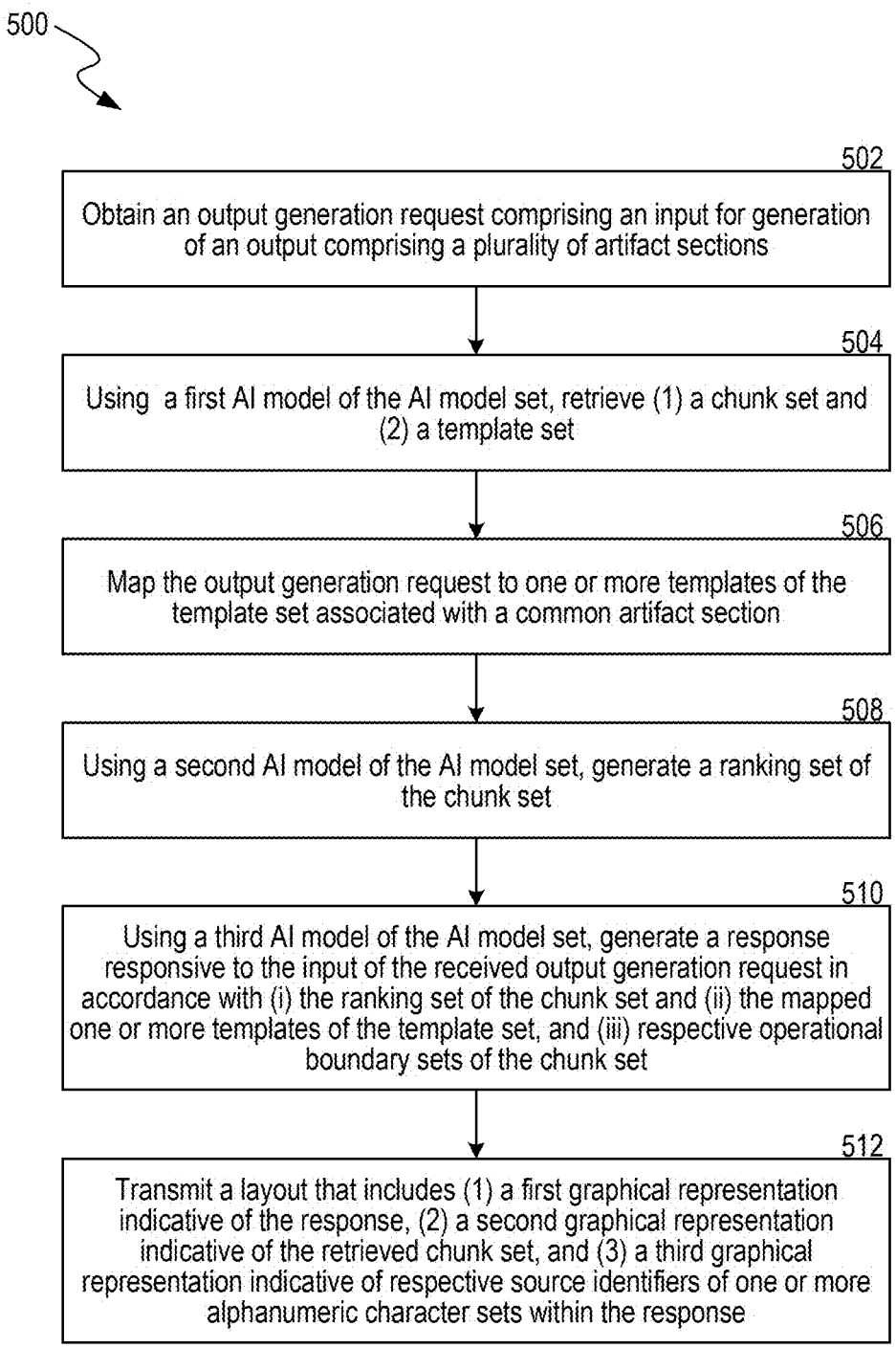
FIG. 5 is a flow diagram illustrating an example process of generating structured documents traceable to source artifacts using AI models according to some implementations of the present technology.

FIG. 5 is a flow diagram illustrating an example process 500 of generating structured documents traceable to source artifacts using AI models according to some implementations of the present technology. In some implementations, the example process 500 is performed by a system (e.g., the data generation platform) including components of the example computing environment 800 illustrated and described in more detail with reference to FIG. 8. The system can be implemented on a terminal device, on a server, or on a telecommunications network core. Likewise, implementations can include different and/or additional operations or can perform the operations in different orders.

In act 502, the data generation platform can receive (e.g., from a GUI, a text-based interface, an API, and so forth) an output generation request comprising an input (e.g., a command set, a query, a natural language prompt) for generation of an output comprising one or more artifact (e.g., a document, an audio file, an image, or a video) sections. The data generation platform can capture user interactions/requests through event listeners attached to form elements, buttons, and other interactive components. The listeners can trigger JavaScript functions that collect input data in a structured format (e.g., JSON).

In act 504, the data generation platform can, using a first AI model (e.g., an LLM) of an AI model set (which can be the same models or different models), retrieve a chunk set, where each chunk of the chunk set is a portion of a source artifact set and a template set. Each template of the template set can be indicative of one or more artifact sections within the plurality of artifact sections to be generated using the source artifact set. To obtain the chunks, the data generation platform can encode the output generation request into a vector representation (e.g., using an encoder). The data generation platform can perform a similarity search against pre-computed embeddings of chunks from the source artifact set stored in a vector database. To obtain the templates, the data generation platform can query a structured database including metadata associated with available templates. The data generation platform can similarly perform a similarity search against pre-computed embeddings of templates to filter and rank the available templates. For each matching template (e.g., those within a predefined distance in the vector space), the data generation platform can retrieve associated rules and guidelines.

Each chunk of the chunk set can be tagged with an operational boundary set defining a pre-loaded query context set associated with a corresponding source artifact of the chunk (e.g., rules requiring the content of the chunk to be used verbatim). The operational boundary set for each chunk can indicate a degree of summarization for the chunk. The degree of summarization can include, for example, verbatim, paraphrase, or summarize. In some implementations, the chunk has pre-associated metadata indicative of the operational boundary set. In some implementations, a pre-trained language model is used to dynamically identify features such as entities, topics, and sentiment within each chunk. Metadata from the source artifact (e.g., document type, author, publication date) can be extracted and associated with the chunk. In some implementations, the data generation platform can apply a set of predefined rules, which can be stored in a configuration database, to determine the operational boundary set. In some implementations, a machine learning classifier, trained on a dataset of labeled examples, can assign initial tags for usage permissions (e.g., verbatim, paraphrase, summarize), which can be encoded as a structured data object (e.g., JSON) and attached to the chunk's metadata. The tagged information can be stored in a distributed key-value store for subsequent retrieval.

In act 506, the data generation platform automatically maps the output generation request to one or more templates within an overall template set stored in a database. Each of the one or more templates can be indicative of at least one document section within the plurality of document sections. For example, the data generation platform tokenizes and vectorizes the output generation request using a pre-trained word embedding model such as BERT (Bidirectional encoder representations from transformers), ROBERTa (Robustly Optimized BERT Pretraining Approach), Word2Vec or GloVe. The data generation platform can perform a semantic similarity search between the vectorized request and the template metadata using metrics such as cosine similarity. In some implementations, a machine learning classifier (e.g., a random forest or neural network) trained on historical mapping data can be used to predict the template(s). The top-ranked templates can be retrieved from the database, with their associated section structures and guidelines. For requests indicating multiple document types, the data generation platform can perform a hierarchical mapping, first identifying the overall document category and then mapping individual sections to more specific sub-templates.

In act 508, the data generation platform can, using a second AI model of the AI model set, generate a ranking set of the chunk set for each particular chunk in the chunk set. In some implementations, the data generation platform determines a first metric value of a first metric using an angle between a vector representation of the output generation request and a vector representation of the particular chunk (e.g., a cosine similarity). The data generation platform can additionally or alternatively determine a second metric value of a second metric using a ratio between a number of shared alphanumeric character sets (e.g., words, a plurality of alphanumeric characters, a single letter) between the output generation request and the particular chunk and a total number of alphanumeric character sets of the particular chunk (e.g., a keyword density). For example, the second metric can represent a Jaccard similarity coefficient between the output generation request and the particular chunk and indicate the ratio of shared words to total unique words. Further, the data generation platform can additionally or alternatively determine a third metric value of a third metric using a temporal period associated with the particular chunk (e.g., weights based on temporal periods). For example, the data generation platform can extract timestamp information from each chunk's metadata and calculate a temporal relevance score using a decay function (e.g., exponential decay) based on the time difference between the chunk's creation date and the current date. Using the first, second, and third metric value, the data generation platform can assign the particular chunk a particular ranking within the ranking set.

In act 510, the data generation platform can, using a third AI model of the AI model set, generate a response responsive to the prompt of the received output generation request in accordance with the ranking set of the chunk set, the template set, and/or the respective operational boundary sets of the chunk set. Each alphanumeric character set within the response can be tagged with one or more source identifiers that each uniquely identify a corresponding chunk of the chunk set to trace source lineage. The data generation platform can construct a context by concatenating the highest-ranked chunks from the ranking set in accordance with their operational boundaries. The data generation platform can construct a prompt by combining the original output generation request, the retrieved template instructions, and the constructed context. The prompt can be tokenized and fed into an LLM (e.g., via sliding window or recursive chunking). As the LLM generates text, the data generation platform can trace the source of each generated token, mapping it back to the input chunks. The data generation platform can maintain a running index of generated content, associating each segment with its source chunks. The index can be used to create inline tags, annotations, and/or hyperlinks in the final output (e.g., as HyperText Markup Language (HTML) tags). The tagged response, along with its lineage metadata can be stored in a versioned document database for subsequent retrieval.

In some implementations, the data generation platform prevents usage of the corresponding chunks in accordance with respective pre-loaded query context sets of the corresponding chunks (e.g., chunks on a denylist). The data generation platform can generate multiple response variants using different combinations of chunks within the chunk set and determine (e.g., select) a response variant from the multiple response variants based on a predefined guideline set.

The data generation platform can generate an explanation set for the response describing a series of steps configured to derive the response. Additionally or alternatively, the data generation platform causes a perceptible representation representing the explanation set via a user interface of the computing device. For example, the perceptible representation is a display on a GUI, a representation on a CLI/TUI, and so forth.

The data generation platform can generate an explanation set for the response, which can include a step-by-step account (or other description) of the operations, decisions, and/or data transformations performed to derive the generated response from the input and source artifacts. The explanation set includes, for example, a chronological or hierarchical list of actions. Additionally or alternatively, the data generation platform causes a perceptible representation of the explanation set to be presented via a user interface of the computing device. For example, the perceptible representation can be a visual overlay, a collapsible sidebar, a modal dialog, an interactive timeline displayed on a GUI, and/or a structured output in a command-line interface (CLI) or text-based user interface (TUI). This enables users to review the provenance and rationale for portion(s) of the generated response. For instance, a user can hover over a section of the generated document to view a tooltip or pop-up that details the specific source chunk(s) used, the ranking metrics that influenced their selection, the operational boundaries applied, the sequence of model decisions leading to the final output, and the like. In some implementations, the explanation set includes links to the original source artifacts, intermediate representations (such as ranked chunk lists or template mappings), logs of user edits or system validations, and so forth.

In some implementations, the data generation platform constructs an "evidence pack" or a response history set including the retrieved chunks, generated response, the ranking set, the source identifiers, and/or a user edit set on the generated response. In some implementations, the specific prompts used, the AI model version and parameters, timestamps for each generation step, the ranking set used to prioritize chunks during generation (final ranking and/or intermediate metric values), and/or the source identifiers can be included in the response history set. In some implementations, user edits made to the generated response can be included in the response history set. The edit history can be stored as a series of versioned changes, each linked to the specific user who made the edit and the timestamp of the modification. The response history set can be stored in a database to enable subsequent retrieval, analysis, and comparison of different document versions over time.

In act 512, the data generation platform can transmit (e.g., cause display of on the GUI, a graphical layout) a first representation indicative of the response, a second representation indicative of the retrieved chunk set, and/or a third representation indicative of respective source identifiers of one or more alphanumeric character sets within the response. In some implementations, the chunks can be displayed as interactive elements using a graph layout indicative of relationships between chunks. Each chunk can be represented as a node, with edges indicating semantic or structural connections. The visualization can be implemented using a web-based graphics library such as D3.js or Three.js. In some implementations, the system color-codes or otherwise visually distinguishes chunks based on their ranking scores or source types and/or provides filtering options to focus on specific subsets of the chunk data. In some implementations, the data generation platform visually distinguishes portions of the generated response based on respective source identifiers, such as using different background colors or border styles. When a user interacts with a sourced segment (e.g., by hovering or clicking), the data generation platform can use event listeners to trigger the display of a tooltip or modal window displaying information indicative of the source, including its full content, metadata, and/or relevance scores.

In some implementations, the data generation platform retrieves a set of predefined guidelines associated with the output generation request. Using a fourth AI model of the AI model set, the data generation platform can evaluate the generated response against the set of predefined guidelines to generate a compliance score for the generated response. The data generation platform can compare the compliance score to a predetermined threshold. Responsive to the compliance score satisfying the predetermined threshold, the data generation platform can cause display of the graphical layout on the GUI (or otherwise transmit the response).

In some implementations, the data generation platform obtains a user-edited response based on receiving a user input to the response via the GUI. Using a fourth AI model of the AI model set, the data generation platform can evaluate the user-edited response against predefined guidelines. Responsive to the user-edited response satisfying the predefined guidelines, the data generation platform can transmit (e.g., cause display of on the GUI) an indication of satisfaction of the user-edited response with the predefined guidelines. In some implementations, the data generation platform compares the user-edited response to the predefined guidelines to identify a discrepancy set between the user-edited response and the predefined guidelines and generates an action set configured to remove the discrepancy set between the user-edited response and the predefined guidelines. The data generation platform can transmit the action set, such as causing display of the action set in the GUI.

Example Implementation of the Models of the Data Generation Platform

Figure 6:
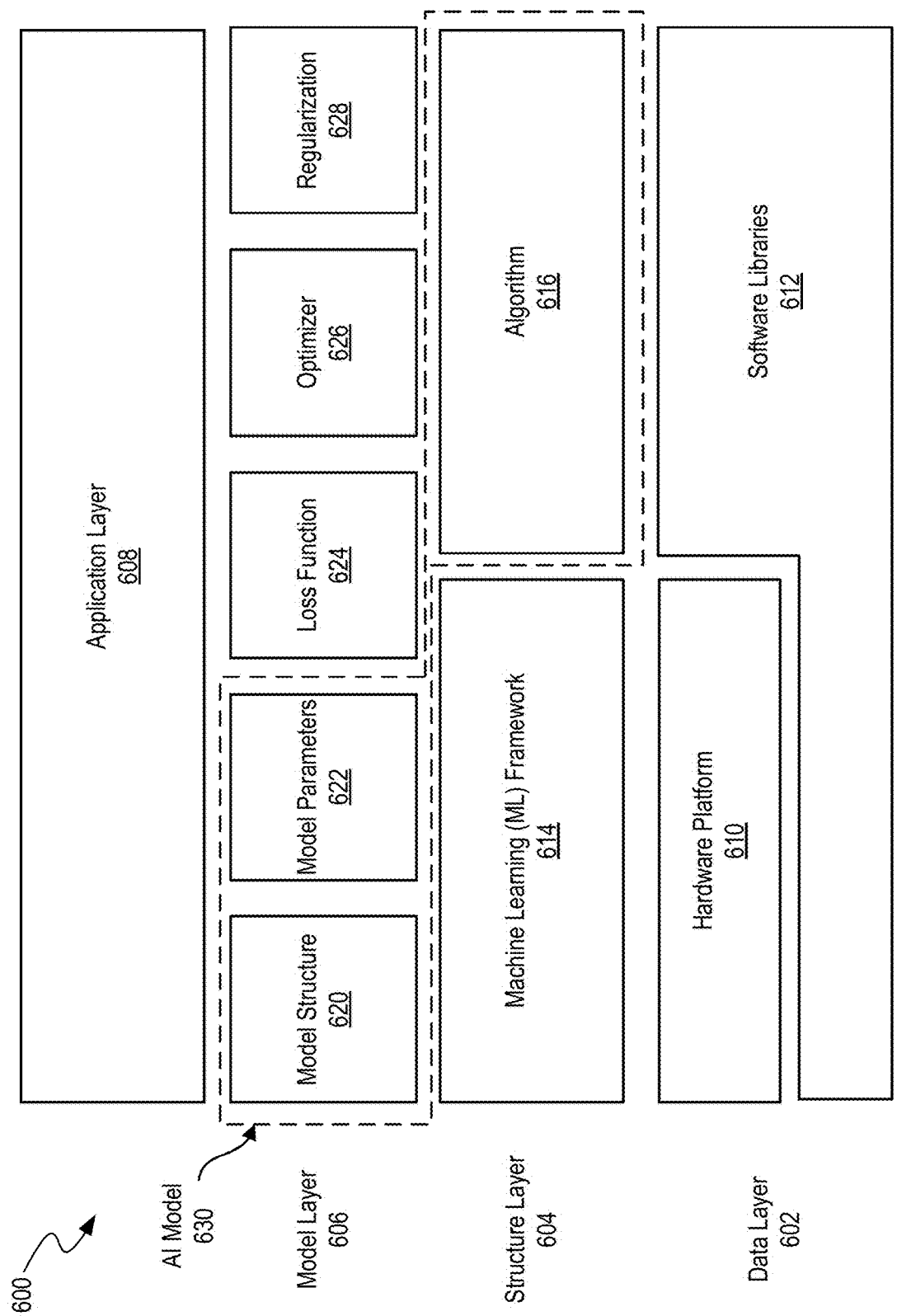
FIG. 6 illustrates a layered architecture of an AI system that can implement the machine learning models of a data generation platform, in accordance with some implementations of the present technology.

FIG. 6 illustrates a layered architecture of an AI system 600 that can implement the ML models of the data generation platform of FIG. 1, in accordance with some implementations of the present technology. Example ML models can include the models executed by the data generation platform, such as the retrieval engine 106, source linkage engine 116, chunk ranking engine 118, prompt engineering engine 120, response generation engine 122, and validation engine 124 can include one or more components of the AI system 600.

As shown, the AI system 600 can include a set of layers, which conceptually organize elements within an example network topology for the AI system's architecture to implement a particular AI model. Generally, an AI model 630 is a computer-executable program implemented by the AI system 600 that analyses data to make predictions. Information can pass through each layer of the AI system 600 to generate outputs for the AI model 630. The layers can include a data layer 602, a structure layer 604, a model layer 606, and an application layer 608. The algorithm 616 of the structure layer 604 and the model structure 620 and model parameters 622 of the model layer 606 together form an example AI model. The optimizer 626, loss function engine 624, and regularization engine 628 work to refine and optimize the AI model, and the data layer 602 provides resources and support for application of the AI model by the application layer 608.

The data layer 602 acts as the foundation of the AI system 600 by preparing data for the AI model. As shown, the data layer 602 can include two sub-layers: a hardware platform 610 and one or more software libraries 612. The hardware platform 610 can be designed to perform operations for the AI model and include computing resources for storage, memory, logic and networking, such as the resources described in relation to FIGS. 7 and 8. The hardware platform 610 can process amounts of data using one or more servers. The servers can perform backend operations such as matrix calculations, parallel calculations, machine learning (ML) training, and the like. Examples of servers used by the hardware platform 610 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 610 can include computing resources, (e.g., servers, memory, etc.) offered by a cloud services provider. The hardware platform 610 can also include computer memory for storing data about the AI model, application of the AI model, and training data for the AI model. The computer memory can be a form of random-access memory (RAM), such as dynamic RAM, static RAM, and non-volatile RAM.

The software libraries 612 can be thought of suites of data and programming code, including executables, used to control the computing resources of the hardware platform 610. The programming code can include low-level primitives (e.g., fundamental language elements) that form the foundation of one or more low-level programming languages, such that servers of the hardware platform 610 can use the low-level primitives to carry out specific operations. The low-level programming languages do not require much, if any, abstraction from a computing resource's instruction set architecture, enabling them to run quickly with a small memory footprint. Examples of software libraries 612 that can be included in the AI system 600 include INTEL Math Kernel Library, NVIDIA cuDNN, EIGEN, and OpenBLAS.

The structure layer 604 can include an ML framework 614 and an algorithm 616. The ML framework 614 can be thought of as an interface, library, or tool that enables users to build and deploy the AI model. The ML framework 614 can include an open-source library, an API, a gradient-boosting library, an ensemble method, and/or a deep learning toolkit that work with the layers of the AI system facilitate development of the AI model. For example, the ML framework 614 can distribute processes for application or training of the AI model across multiple resources in the hardware platform 610. The ML framework 614 can also include a set of pre-built components that have the functionality to implement and train the AI model and enable users to use pre-built functions and classes to construct and train the AI model. Thus, the ML framework 614 can be used to facilitate data engineering, development, hyperparameter tuning, testing, and training for the AI model. Examples of ML frameworks 614 that can be used in the AI system 600 include TENSORFLOW, PYTORCH, SCIKIT-LEARN, KERAS, LightGBM, RANDOM FOREST, and AMAZON WEB SERVICES.

The algorithm 616 can be an organized set of computer-executable operations used to generate output data from a set of input data and can be described using pseudocode. The algorithm 616 can include complex code that enables the computing resources to learn from new input data and create new/modified outputs based on what was learned. In some implementations, the algorithm 616 can build the AI model through being trained while running computing resources of the hardware platform 610. This training enables the algorithm 616 to make predictions or decisions without being explicitly programmed to do so. Once trained, the algorithm 616 can run at the computing resources as part of the AI model to make predictions or decisions, improve computing resource performance, or perform tasks. The algorithm 616 can be trained using supervised learning, unsupervised learning, semi-supervised learning, and/or reinforcement learning.

Using supervised learning, the algorithm 616 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of input 102 in FIG. 1) from various source computing systems described in relation to FIG. 1. Furthermore, training data can include pre-processed data generated by various engines of the data generation platform described in relation to FIG. 1. The user may label the training data based on one or more classes and trains the AI model by inputting the training data to the algorithm 616. The algorithm determines how to label the new data based on the labeled training data. The user can facilitate collection, labeling, and/or input via the ML framework 614. In some instances, the user may convert the training data to a set of feature vectors for input to the algorithm 616. Once trained, the user can test the algorithm 616 on new data to determine if the algorithm 616 is predicting accurate labels for the new data. For example, the user can use cross-validation methods to test the accuracy of the algorithm 616 and retrain the algorithm 616 on new training data if the results of the cross-validation are below an accuracy threshold.

Supervised learning can include classification and/or regression. Classification techniques include teaching the algorithm 616 to identify a category of new observations based on training data and are used when input data for the algorithm 616 is discrete. Said differently, when learning through classification techniques, the algorithm 616 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 616 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques include estimating relationships between independent and dependent variables and are used when input data to the algorithm 616 is continuous. Regression techniques can be used to train the algorithm 616 to predict or forecast relationships between variables. To train the algorithm 616 using regression techniques, a user can select a regression method for estimating the parameters of the model. The user collects and labels training data that is input to the algorithm 616 such that the algorithm 616 is trained to understand the relationship between data features and the dependent variable(s). Once trained, the algorithm 616 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine learning based pre-processing operations.

Under unsupervised learning, the algorithm 616 learns patterns from unlabeled training data. In particular, the algorithm 616 is trained to learn hidden patterns and insights of input data, which can be used for data exploration or for generating new data. Here, the algorithm 616 does not have a predefined output, unlike the labels output when the algorithm 616 is trained using supervised learning. Said another way, unsupervised learning is used to train the algorithm 616 to find an underlying structure of a set of data, group the data according to similarities, and represent that set of data in a compressed format. The data generation platform can use unsupervised learning to identify patterns in claim history (e.g., to identify particular event sequences) and so forth. In some implementations, performance of the data generation platform that can use unsupervised learning is improved because the incoming input 102 is pre-processed and reduced, based on the relevant triggers, as described herein.

A few techniques can be used in supervised learning: clustering, anomaly detection, and techniques for learning latent variable models. Clustering techniques include grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 616 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 616 may be trained to be an Isolation Forest, local outlier factor (LOF) algorithm, or K-nearest neighbor (k-NN) algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that may be used by the algorithm 616 include factor analysis, item response theory, latent profile analysis, and latent class analysis.

The model layer 606 implements the AI model using data from the data layer and the algorithm 616 and ML framework 614 from the structure layer 604, thus enabling decision-making capabilities of the AI system 600. The model layer 606 includes a model structure 620, model parameters 622, a loss function engine 624, an optimizer 626, and a regularization engine 628.

The model structure 620 describes the architecture of the AI model of the AI system 600. The model structure 620 defines the complexity of the pattern/relationship that the AI model expresses. Examples of structures that can be used as the model structure 620 include decision trees, support vector machines, regression analyses, Bayesian networks, Gaussian processes, genetic algorithms, and artificial neural networks (or, simply, neural networks). The model structure 620 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 620 may include one or more hidden layers of nodes between the input and output layers. The model structure 620 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 622 represent the relationships learned during training and can be used to make predictions and decisions based on input data. The model parameters 622 can weight and bias the nodes and connections of the model structure 620. For instance, when the model structure 620 is a neural network, the model parameters 622 can weight and bias the nodes in each layer of the neural networks, such that the weights determine the strength of the nodes and the biases determine the thresholds for the activation functions of each node. The model parameters 622, in conjunction with the activation functions of the nodes, determine how input data is transformed into desired outputs. The model parameters 622 can be determined and/or altered during training of the algorithm 616.

The loss function engine 624 can determine a loss function, which is a metric used to evaluate the AI model's performance during training. For instance, the loss function engine 624 can measure the difference between a predicted output of the AI model and the actual output of the AI model and is used to guide optimization of the AI model during training to minimize the loss function. The loss function may be presented via the ML framework 614, such that a user can determine whether to retrain or otherwise alter the algorithm 616 if the loss function is over a threshold. In some instances, the algorithm 616 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cos h loss function, and quantile loss function.

The optimizer 626 adjusts the model parameters 622 to minimize the loss function during training of the algorithm 616. In other words, the optimizer 626 uses the loss function generated by the loss function engine 624 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 626 used may be determined based on the type of model structure 620 and the size of data and the computing resources available in the data layer 602.

The regularization engine 628 executes regularization operations. Regularization is a technique that prevents over- and under-fitting of the AI model. Overfitting occurs when the algorithm 616 is overly complex and too adapted to the training data, which can result in poor performance of the AI model. Underfitting occurs when the algorithm 616 is unable to recognize even basic patterns from the training data such that it cannot perform well on training data or on validation data. The optimizer 626 can apply one or more regularization techniques to fit the algorithm 616 to the training data properly, which helps constraint the resulting AI model and improves its ability for generalized application. Examples of regularization techniques include lasso (L1) regularization, ridge (L2) regularization, and elastic (L1 and L2 regularization).

The application layer 608 describes how the AI system 600 is used to solve problem or perform tasks. In an example implementation, the application layer 608 can include a front-end user interface of the data generation platform.

Example Computing Environment of the Data Generation Platform

Figure 7:
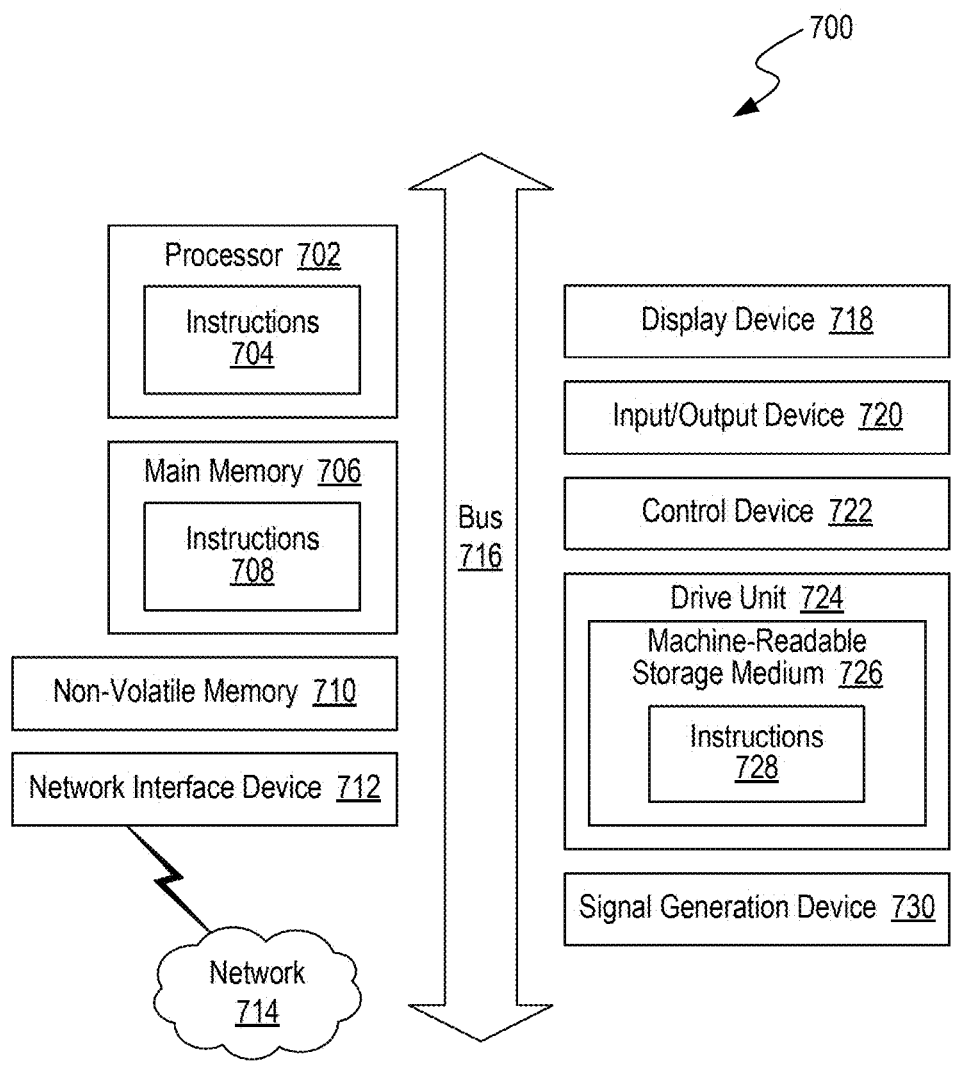
FIG. 7 is a block diagram showing some of the components typically incorporated in at least some of the computer systems and other devices on which the data generation platform operates in accordance with some implementations of the present technology.

FIG. 7 is a block diagram showing some of the components typically incorporated in at least some of the computer systems and other devices 700 on which the disclosed system operates in accordance with some implementations of the present technology. As shown, an example computer system 700 can include: one or more processors 702, main memory 706, non-volatile memory 710, a network interface device 712, video display device 718, an input/output device 720, a control device 722 (e.g., keyboard and pointing device), a drive unit 724 that includes a machine-readable medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computer system 700 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 700. In some implementations, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real time, near real time, or in batch mode.

The network interface device 712 enables the computer system 700 to exchange data in a network 714 with an entity that is external to the computing system 700 through any communication protocol supported by the computer system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computer system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computer system 700 to perform operations to execute elements involving the various aspects of the disclosure.

Figure 8:
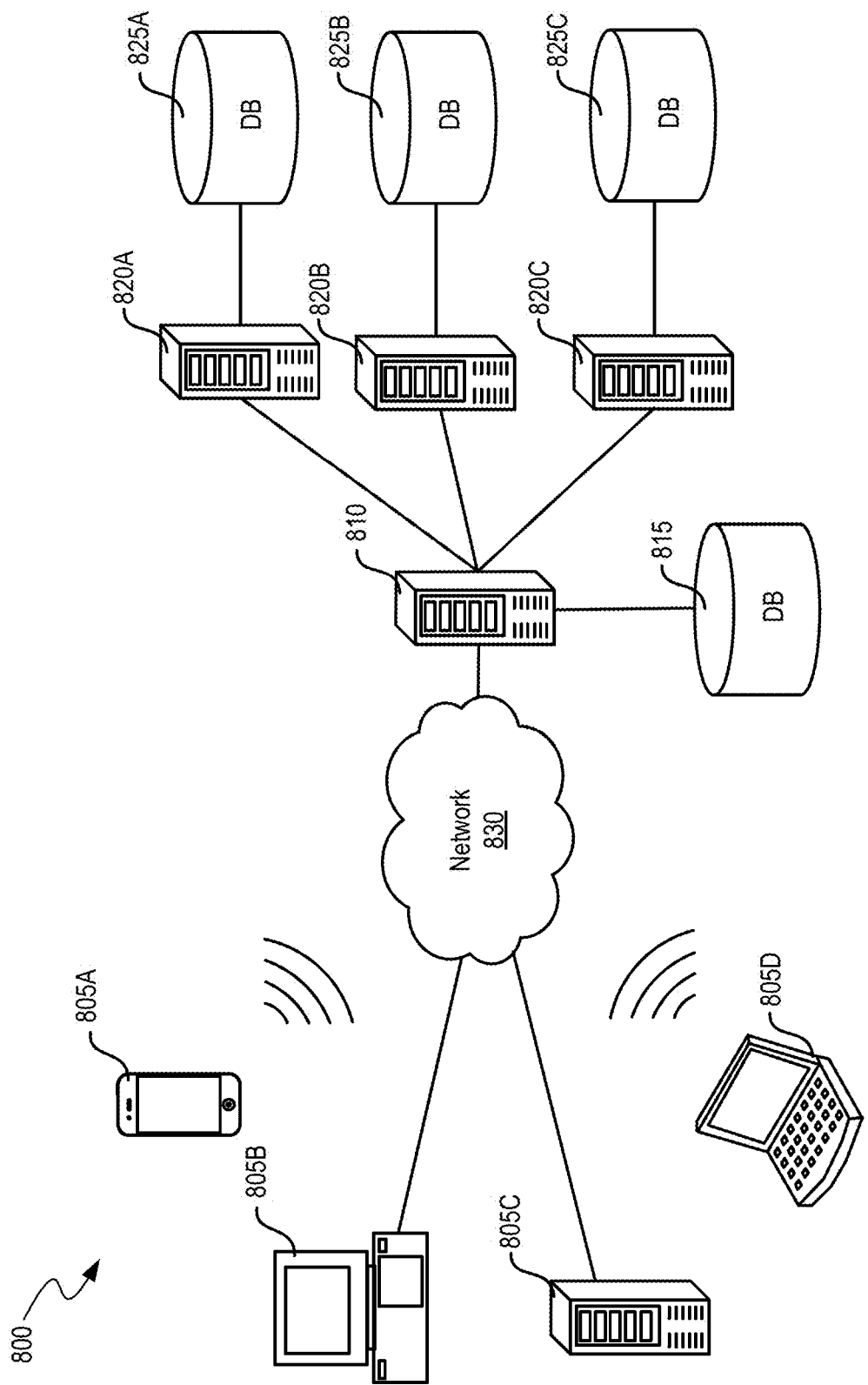
FIG. 8 is a system diagram illustrating an example of a computing environment in which the data generation platform operates in some implementations of the present technology.

FIG. 8 is a system diagram illustrating an example of a computing environment in which the disclosed system operates in some implementations. In some implementations, environment 800 includes one or more client computing devices 805A-D, examples of which can host the data generation platform of FIG. 1. Client computing devices 805 operate in a networked environment using logical connections through network 830 to one or more remote computers, such as a server computing device.

In some implementations, server 810 is an edge server which receives client requests and coordinates fulfillment of those requests through other servers, such as servers 820A-C. In some implementations, server computing devices 810 and 820 comprise computing systems, such as the data generation platform of FIG. 1. Though each server computing device 810 and 820 is displayed logically as a single server, server computing devices can each be a distributed computing environment encompassing multiple computing devices located at the same or at geographically disparate physical locations. In some implementations, each server 820 corresponds to a group of servers.

Client computing devices 805 and server computing devices 810 and 820 can each act as a server or client to other server or client devices. In some implementations, servers (810, 820A-C) connect to a corresponding database (815, 825A-C). As discussed above, each server 820 can correspond to a group of servers, and each of these servers can share a database or can have its own database. Databases 815 and 825 warehouse (e.g., store) information such as claims data, email data, call transcripts, call logs, policy data and so on. Though databases 815 and 825 are displayed logically as single units, databases 815 and 825 can each be a distributed computing environment encompassing multiple computing devices, can be located within their corresponding server, or can be located at the same or at geographically disparate physical locations.

Network 830 can be a local area network (LAN) or a wide area network (WAN), but can also be other wired or wireless networks. In some implementations, network 830 is the Internet or some other public or private network. Client computing devices 805 are connected to network 830 through a network interface, such as by wired or wireless communication. While the connections between server 810 and servers 820 are shown as separate connections, these connections can be any kind of local, wide area, wired, or wireless network, including network 830 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A system for dynamically generating structured documents using artificial intelligence (AI) models, the system comprising:

at least one hardware processor; and at least one non-transitory memory storing instructions, which, when executed by the at least one hardware processor, cause the system to:

receive, from a graphical user interface (GUI), an
output generation request comprising a prompt for
generation of an output comprising a plurality of
document sections;

using a first AI model of an AI model set, retrieve (1)
a chunk set, wherein each chunk of the chunk set is
a portion of a source document set and (2) a template
set,
- wherein each template of the template set is indicative of one or more document sections within the plurality of document sections to be generated using the source document set, and
- wherein each chunk of the chunk set is tagged with an operational boundary set defining a pre-loaded query context set associated with a corresponding source document of the chunk;

using a second AI model of the AI model set, generate a ranking set of the chunk set by, for each particular chunk in the chunk set:
- determining a first metric value of a first metric using an angle between (i) a vector representation of the output generation request and (ii) a vector representation of the particular chunk,
- determining a second metric value of a second metric using a ratio between (i) a number of shared alphanumeric character sets between the output generation request and the particular chunk and (ii) a total number of alphanumeric character sets of the particular chunk, wherein each alphanumeric character set has a plurality of alphanumeric characters,
- determining a third metric value of a third metric using a temporal period associated with the particular chunk, and
- using the first, second, and third metric values, assigning the particular chunk a particular ranking within the ranking set;

using a third AI model of the AI model set, generate a response responsive to the prompt of the received output generation request in accordance with (i) the ranking set of the chunk set, (ii) the template set, and (iii) respective operational boundary sets of the chunk set, wherein each alphanumeric character set within the response is tagged with one or more source identifiers that each uniquely identify a corresponding chunk of the chunk set; and cause display of, on the GUI, a graphical layout that includes (1) a first graphical representation indicative of the response, (2) a second graphical representation indicative of the retrieved chunk set, and (3) a third graphical representation indicative of respective source identifiers, of the one or more source identifiers, of one or more alphanumeric character sets of the alphanumeric character sets within the response.

2. The system of claim 1, wherein retrieving the template set further causes the system to:
map the output generation request to one or more templates within an overall template set stored in a database, wherein each of the one or more templates is indicative of at least one document section within the plurality of document sections.

3. The system of claim 1, wherein the system is further caused to:
retrieve a set of predefined guidelines associated with the output generation request;

using a fourth AI model of the AI model set, evaluate the generated response against the set of predefined guidelines to generate a compliance score for the generated response;

compare the compliance score to a predetermined threshold; and responsive to the compliance score satisfying the predetermined threshold, cause display of the graphical layout on the GUI.

4. The system of claim 1, wherein one or more of: the first, second, or third AI models are the same.

5. The system of claim 1, wherein the system is further caused to:
obtain a user-edited response based on receiving a user input to the response via the GUI;

using a fourth AI model of the AI model set, evaluate the user-edited response against predefined guidelines; and responsive to the user-edited response satisfying the predefined guidelines, cause display of, on the GUI, an indication of satisfaction of the user-edited response with the predefined guidelines.

6. The system of claim 5, wherein evaluating the user-edited response further causes the system to:
compare the user-edited response to the predefined guidelines to identify a discrepancy set between the user-edited response and the predefined guidelines;

generate an action set configured to remove the discrepancy set between the user-edited response and the predefined guidelines; and cause display of the action set in the GUI.

7. One or more non-transitory computer-readable media, carrying instructions that, when executed by a computing system, cause the computing system to:
receive, from a graphical user interface (GUI), an output generation request comprising a prompt for generation of an output comprising a plurality of document sections;

using a first AI model of an AI model set, retrieve (1) a chunk set, wherein each chunk of the chunk set is a portion of a source document set and (2) a template set,
- wherein each template of the template set is indicative of one or more document sections within the plurality of document sections to be generated using the source document set, and
- wherein each chunk of the chunk set is tagged with an operational boundary set defining a pre-loaded query context set associated with a corresponding source document of the chunk;

using a second AI model of the AI model set, generate a ranking set of the chunk set by, for each particular chunk in the chunk set:
- determining a first metric value of a first metric using an angle between (i) a vector representation of the output generation request and (ii) a vector representation of the particular chunk,
- determining a second metric value of a second metric using a ratio between (i) a number of shared alphanumeric character sets between the output generation request and the particular chunk and (ii) a total number of alphanumeric character sets of the particular chunk, wherein each alphanumeric character set has a plurality of alphanumeric characters,
- determining a third metric value of a third metric using a temporal period associated with the particular chunk, and using the first, second, and third metric values, assigning the particular chunk a particular ranking within the ranking set;

using a third AI model of the AI model set, generate a response responsive to the prompt of the received output generation request in accordance with (i) the ranking set of the chunk set, (ii) the template set, and (iii) respective operational boundary sets of the chunk set, wherein each alphanumeric character set within the response is tagged with one or more source identifiers that each uniquely identify a corresponding chunk of the chunk set; and cause display of, on the GUI, a graphical layout that includes (1) a first graphical representation indicative of the response, (2) a second graphical representation indicative of the retrieved chunk set, and (3) a third graphical representation indicative of respective source identifiers, of the one or more source identifiers, of one or more alphanumeric character sets of the alphanumeric character sets within the response.

8. The one or more non-transitory, computer-readable storage media of claim 7, wherein the first metric represents cosine similarity, and wherein the second metric indicates a keyword density.

9. The one or more non-transitory, computer-readable storage media of claim 7, wherein each chunk of the chunk set is tagged with an operational boundary set defining a pre-loaded query context set associated with a corresponding source artifact of the chunk.

10. The one or more non-transitory, computer-readable storage v of claim 7, wherein generating the response further comprises preventing usage of the corresponding chunks in accordance with respective pre-loaded query context sets of the corresponding chunks.

11. The one or more non-transitory, computer-readable storage media of claim 7, wherein the prompt comprises a natural language prompt, and wherein retrieving the template set comprises mapping the natural language prompt to one or more templates within an overall template set stored in a database.

12. The one or more non-transitory, computer-readable storage media of claim 7, wherein one or more of: the first, second, or third AI models are the same.

13. The one or more non-transitory, computer-readable storage media of claim 7, wherein one or more of: the first, second, or third AI models is a large language model.

14. A computer-implemented method, the computer-implemented method comprising:

receiving, from a graphical user interface (GUI), an output generation request comprising a prompt for generation of an output comprising a plurality of document sections;

using a first AI model of an AI model set, retrieving (1) a chunk set, wherein each chunk of the chunk set is a portion of a source document set and (2) a template set, wherein each template of the template set is indicative of one or more document sections within the plurality of document sections to be generated using the source document set, and wherein each chunk of the chunk set is tagged with an operational boundary set defining a pre-loaded query context set associated with a corresponding source document of the chunk;

using a second AI model of the AI model set, generating a ranking set of the chunk set by, for each particular chunk in the chunk set:

determining a first metric value of a first metric using an angle between (i) a vector representation of the output generation request and (ii) a vector representation of the particular chunk, determining a second metric value of a second metric using a ratio between (i) a number of shared alphanumeric character sets between the output generation request and the particular chunk and (ii) a total number of alphanumeric character sets of the particular chunk, wherein each alphanumeric character set has a plurality of alphanumeric characters, determining a third metric value of a third metric using a temporal period associated with the particular chunk, and using the first, second, and third metric values, assigning the particular chunk a particular ranking within the ranking set;

using a third AI model of the AI model set, generating a response responsive to the prompt of the received output generation request in accordance with (i) the ranking set of the chunk set, (ii) the template set, and (iii) respective operational boundary sets of the chunk set, wherein each alphanumeric character set within the response is tagged with one or more source identifiers that each uniquely identify a corresponding chunk of the chunk set; and causing display of, on the GUI, a graphical layout that includes (1) a first graphical representation indicative of the response, (2) a second graphical representation indicative of the retrieved chunk set, and (3) a third graphical representation indicative of respective source identifiers, of the one or more source identifiers, of one or more alphanumeric character sets of the alphanumeric character sets within the response.

15. The computer-implemented method of claim 14, further comprising:

generating multiple response variants using different combinations of chunks within the chunk set; and determining a response variant from the multiple response variants based on a predefined guideline set.

16. The computer-implemented method of claim 14, further comprising:

constructing a response history set including one or more of: the generated response or a user edit set on the generated response.

17. The computer-implemented method of claim 14, further comprising:

generating an explanation set for the response describing a series of steps configured to derive the response; and causing a perceptible representation representing the explanation set via the GUI.

18. The computer-implemented method of claim 14, wherein the response includes one or more of: a document, an audio file, an image, or a video.

19. The computer-implemented method of claim 14, wherein retrieving the template set comprises mapping the output generation request to one or more templates within an overall template set stored in a database.

20. The computer-implemented method of claim 14, wherein one or more of: the first, second, or third AI models are the same.

* * * * *